Figure 1A:
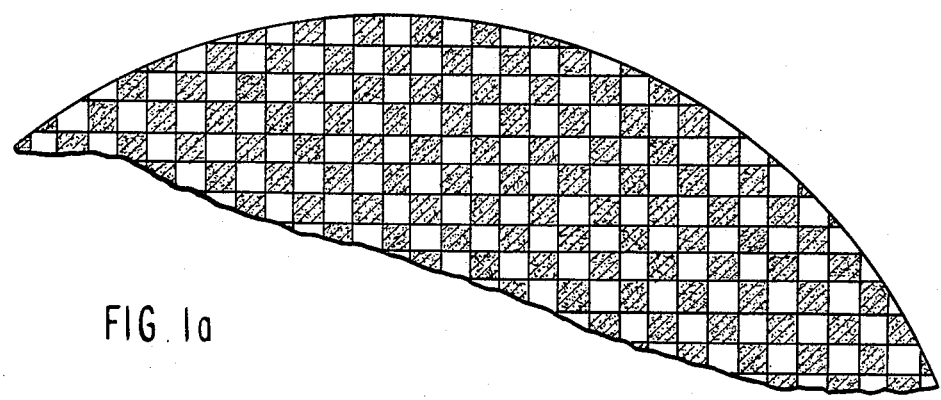

United States Patent [19]

Domesle et al.

[11] Patent Number: 4,515,758
[45] Date of Patent: May 7, 1985

[54] PROCESS AND CATALYST FOR THE REDUCTION OF THE IGNITION TEMPERATURE OF DIESEL SOOT FILTERED OUT OF THE EXHAUST GAS OF DIESEL ENGINES

[75] Inventors: Rainer Domesle, Maintal; Edgar Koberstein, Alzenau; Hans-Dieter Pletka, Freigericht; Herbert Voelker, Hanau, all of Fed. Rep. of Germany

[73] Assignee: Degussa Aktiengesellschaft, Frankfurt, Fed. Rep. of Germany

[21] Appl. No.: 521,292

[22] Filed: Aug. 8, 1983

[30] Foreign Application Priority Data

Sep. 3, 1982 [DE] Fed. Rep. of Germany ....... 3232729

[51] Int. Cl.³ .............................................. B01D 53/36
[52] U.S. Cl. ............................. 423/213.2; 423/213.5; 423/213.7; 423/215.5; 60/297; 60/299; 502/344; 502/348
[58] Field of Search ............. 423/212 C, 213.2, 213.5, 423/213.7, 215.5; 60/297, 299, 311

[56] References Cited

U.S. PATENT DOCUMENTS 3,499,269  3/1970  Bois ........................................ 60/311
4,003,976  1/1977  Komatsu et al. ................... 423/213.5
4,414,139 11/1983  Matsuzaka et al. .............. 423/213.5

FOREIGN PATENT DOCUMENTS 60503    9/1982  European Pat. Off. ............. 60/299
162629  10/1982  Japan ................................. 423/213.2
413744   7/1934  United Kingdom ............. 423/213.2
1014498 12/1965  United Kingdom ............. 423/213.2
2062487  5/1981  United Kingdom .

OTHER PUBLICATIONS

German O.S. 2,951,316, 7-2-1981 abstracted in Chemical Abstracts, vol. 95, 174806u—Bozon et al.

Primary Examiner—Earl C. Thomas
Assistant Examiner—Jeffrey E. Russel
Attorney, Agent, or Firm—Beveridge, DeGrandi & Weilacher

[57] ABSTRACT

A catalyst process is disclosed for the reduction of the ignition temperature of Diesel soot filtered out of the exhaust gas of Diesel engines by passing the exhaust gas over a catalytically active substance, which is selected from lithium oxide, copper chloride, vanadium oxide/alkali metal oxide combinations, a vanadate of an alkali metal or of cerium, or a silver or alkali metal perrhenate, preferably of sodium or silver, or mixtures of these substances.

7 Claims, 3 Drawing Figures

PROCESS AND CATALYST FOR THE REDUCTION OF THE IGNITION TEMPERATURE OF DIESEL SOOT FILTERED OUT OF THE EXHAUST GAS OF DIESEL ENGINES

The invention relates to a catalyst and process for the reduction of the ignition temperature of Diesel soot filtered out of the exhaust gas of Diesel engines. The invention is a further development in the treatment of Diesel exhausts as described in our copending U.S. patent application Ser. No. 434,806 filed Oct. 18, 1982, now U.S. Pat. No. 4,455,393, the entire disclosure of which is incorporated and relied on herein.

Diesel engines, because of their method of operation, emit soot particles or very fine droplets of condensate or a conglomerate of the two ("particulates"), in addition to the usual harmful substances, such as hydrocarbons, nitrogen oxides and CO, as emitted also by gasoline engines. These "particulates", referred to herein as "Diesel soot" are particularly rich in condensed, polynuclear hydrocarbons, a few of which have been found to be carcinogenic.

The proposal has previously been made to capture the soot and condensate particles in traps or filters. Since, however, the temperatures of Diesel exhaust gases under normal operational conditions are not sufficient for burning off the accumulated soot, as for this at least 450°–600° C. is needed depending on the engine related composition of the soot, care must be taken for a timely increase of the exhaust gas temperature for the regeneration of the trap or of the filter, in order to avoid an accumulation of soot and thus of obstructions. This may be accomplished, inter alia, in such a way that the air/fuel mixture formed in the engine is periodically enriched and thus higher exhaust gas temperatures are produced. Another possibility provides for the disposition of a burner in the exhaust gas system before the filter, which is ignited as needed and takes care of the temperature required for burning off the soot.

These methods of solving the problem are, however, connected with additional fuel consumption and thus partially reduce an important advantage of the Diesel engine.

It has now been found that the ignition temperature of Diesel soot may be lowered by equipping the soot filter or the soot trap with a special catalyst or with a temperature stable substance containing it, and that thereby it is possible to achieve especially an important decrease in fuel consumption during the regeneration phase of a filter.

The present invention is a further development of the invention disclosed in our above mentioned U.S. patent application which relates to a way for lowering the ignition temperature of Diesel soot filtered out of the exhaust gas of Diesel engines, with the use of silver vanadate as catalytically active substance.

Consequently, the object of the invention is a process for reducing the ignition temperature of Diesel soot filtered out of the exhaust gas of Diesel engines which is characterized in that the exhaust gas is conducted over one of the following catalytically active substances:

lithium oxide,
copper (I)-chloride,
vanadium pentoxide with 1–30% by weight of alkali metal oxide,
a vanadate of cerium or an alkali metal preferably lithium, sodium, potassium, or a perrhenate, preferably of silver or an alkali metal such as sodium or potassium or
a combination or mixture of two or more of these substances.

The catalytically active substance of the invention is used in a catalytically effective amount and may be precipitated on a thermally stable (temperature resistant) carrier substance or be mixed with it. As carrier materials, conventional substances, especially transitional alumina may be used, other examples are silica, titanium dioxide, zirconium oxide and oxides of the rare earth metals, as well as copper chromium oxide ($CuCr_2O_4$), nickel oxide and iron oxides.

It is preferable that the catalytically active substance or its combination with a carrier material is applied to a filter element serving as structural reinforcer.

As a structural reinforcer, a packing of temperature resistant, shaped metal body or mineral wool, or a filter element according to German OS No. 29 44 841 or German OS No. 29 51 316 or preferably a monolithic ceramic body with numerous flow channels may be used, the channel openings of which are provided on opposite end surfaces with closing means in such a way that a channel open in one front surface is always closed in the opposite end surface. Such catalytically inert carrier bodies are well known in the art.

An effective development for practical use of the process of the invention provides that the filter element is disposed in the flow cross-section of a housing provided with inflow and outflow channels for the exhaust gas; i.e. in the exhaust gas stream.

A desirable variation of the invention provides that there be a noble metal impregnation in addition to the active substance. It is preferred that the active substance is applied in the area of the filter inlet side and the noble metal impregnation subsequently thereto in the area of the filter outlet side. Noble metals such as platinum, palladium, etc. and mixtures may be used in their customary amounts as is known in the art.

It should be noted that the suitability of the stated catalytically active substances for their stated use is related to their melting properties or their sublimation behavior. Thus, the overwhelming majority of the listed substances melt at temperatures below about 750° C., and therefore at temperatures which lie in the range of the customary, achievable exhaust gas temperatures of Diesel engines, while the other compounds under these conditions exhibit a noticeable vapor pressure.

For the practical use of the catalyst lowering the ignition temperature of Diesel soot, the active compound or its combination with a carrier material is applied on a filter element serving as structural reinforcer. The formation of washcoats and their use in catalyst technology is well known by now and therefore the conventional procedures may be used in this invention.

The quantity of active substance to be applied in the individual case onto a carrier material or a filter element is less critical with regard to the lower limit than with regard to the upper limit.

Generally as a minimum amount, it will be sufficient, whenever a carrier or a filtering structural reinforcer coated with carrier material contains the active substance in a quantity of 4 $g/m^2$ of geometric surface. The upper range is limited by the maximum permissible drop in pressure over a given filter system. Accordingly, a generally suitable range is from a minimum of about 4 $g/m^2$ to an upper amount which does not produce an unacceptably high pressure drop in the system. In case of a conventional monolithic filter body of cordierite with 11.85 cm diameter, 15.25 cm length and 15.5 cells/cm$^2$, 10–100, preferably 20–60 g/m$^2$ may be applied.

As a structural reinforcer for the catalyst or a substance system containing it, conventional filter systems for the Diesel exhaust gases may be used, in which inlet- and outlet channels for the exhaust gas are disposed such that in the case of the greatest possible filtering effort, a minimum of pressure loss occurs.

As structural reinforcer, a packing of thermally stable metal- or mineral wool or a filter element according to German OS No. 29 44 841 or according to German OS No. 29 51 316 can be used. The use of a monolithic ceramic body, through which numerous flow channels pass, has turned out to be particularly favorable. The channel openings of which are provided in opposite end surfaces in such a way, that a channel open in one end surface is always closed in the opposite end surface. Such a filter therefore has the shape of a conventional, monolithic, structural reinforcer for catalysts and may consist of α-aluminum oxide or cordierite. The flow channels have macro-porous walls which are used as filter surfaces. In order to achieve this, a channel open at one end surface is always closed on the opposite end surface. The closure is accomplished with a ceramic plug, which is either sintered together with the material of the monolith or is glued together by means of a fire-resistant cement. The exhaust gas is therefore forced by obstructions, to flow through the macroporous walls of the channel as a result of which the Diesel soot is filtered and separated from the exhaust gas.

Since the Diesel soot does not consist merely of carbon particles, but also contains about 20–30% adsorbed volatalizable hydrocarbons it may be of advantage to additionally impregnate the described catalytic Diesel filters with noble metal for the removal of said hydrocarbons. It has been proven to be particularly advantageous to coat the exhaust gas inlet side of the filter with the catalyst of the invention and the exhaust gas discharge side of the filter with a noble metal catalyst, consisting of at least one element of the platinum group of metals, possibly together with a catalysis-promoting metal oxide, such as γ-Al$_2$O$_3$. This has the additional advantage, that the carbon monoxide possibly developing during the burning off of the Diesel soot is converted by the noble metal catalyst into harmless carbon dioxide. The techniques employing noble metals and catalysis promoting oxides are well known in this art and may be used in combination with the present invention.

Figure 1B:
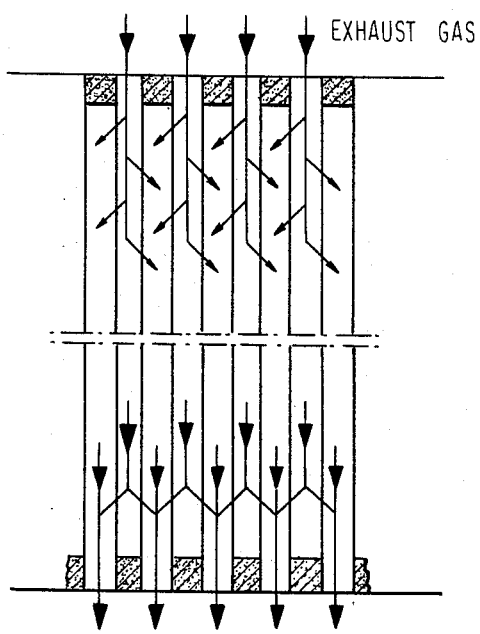
Figure 2:
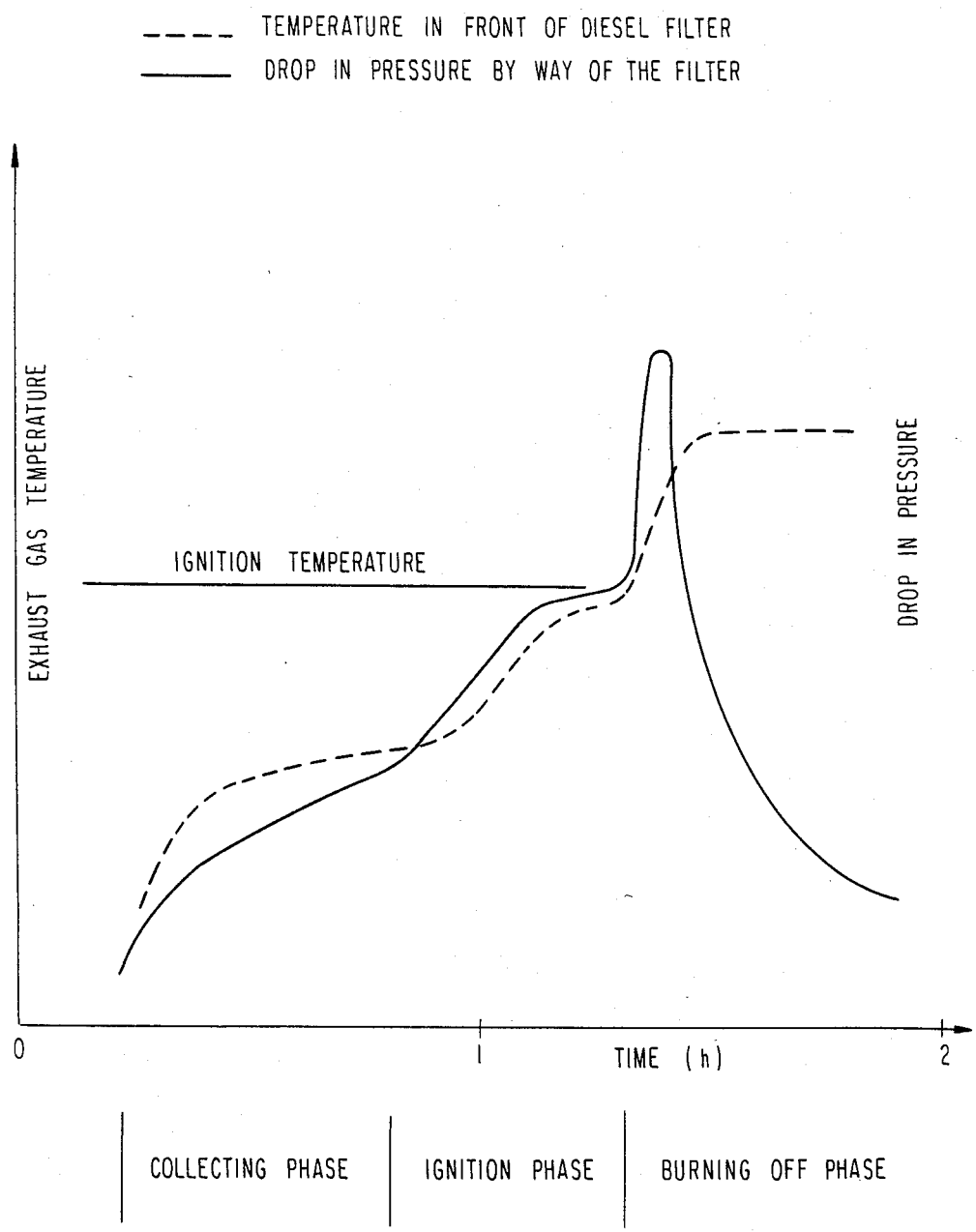

The invention will be explained below on the basis of embodiments shown in more detail in the drawings wherein:

FIG. 1a shows a top view and FIG. 1b is a section view of a Diesel filter in the form of a conventional monolithic structural reinforcer for catalysts made of cordierite with porous walls of the flow channels, wherein channels on the inlet end surface and the discharge end surface are selectively closed with a ceramic plug. These plugs are distributed such that a closed end of a channel is always opposite an open one;

FIG. 2 shows a schematic presentation of a regeneration cycle of a filter, equipped according to the invention, with collecting phase, ignition phase and burning-off phase as well as with the pertinent temperature and differential pressure profiles.

On the abscissa there is shown time sections in a manner of a model for one collecting-, ignition- and burning off phase. The course of temperature and back pressure (pressure differential over the filter) are assigned to the ordinate. The drop in pressure (solid line) rises in the collecting phase in case of a definite rpm and load to a predetermined value. Then the load and thus the temperature of the exhaust gas are regulated, until the temperature of the exhaust gas and the pressure drop between the exhaust gas entrance and the exit of the filter element does not rise significantly as is shown by the approximately horizontal portion of the curve for drop in pressure. In this nearly horizontal area essentially the amount of soot delivered from the diesel engine is no longer collected within the filter but is continuously ignited and burned off. In this case filtered out and burnt off soot are approximately in equilibrium. The temperature of the exhaust gas measured at the same time in front of the filter is called ignition temperature. For a complete regeneration of the filter the load is increased further, until a steep drop of the differential pressure over the filter has taken place by burning off the residual soot load to about the starting level. The load is then adjusted back to "normal operation".

The following examples illustrate the invention:

EXAMPLE 1

15.00 g of potassium perrhenate (KReO$_4$) are dissolved in 1200 ml of de-ionized water in a beaker and the solution is divided in 4 parts. A commercially obtainable monolithic filter body of cordierite, as shown in FIG. 1, with 11.85 cm diameter, 15.25 cm length and 15.5 cells/cm$^2$ is poured over from the direction of the front end surfaces with one part of the solution for impregnation and is subsequently dried at 200° C. This process is repeated with the remaining 3 solution parts.

EXAMPLE 2

A solution of 40 g of potassium vanadate (KVO$_3$) is prepared in 500 ml of de-ionized water. A filter body, as used in example 1, is impregnated with this solution by pouring it twice over the one end surface with 2 hours of intermediate drying at 250° C. A subsequent drying for 2 hours likewise at 250° C. results in the finished catalytic filter.

EXAMPLE 3

100 g of copper (I)-chloride (Merck No: 2738) are rolled with 140 ml of deionized water for 24 hours in a ball mill. Then this is diluted with de-ionized water up to 560 ml and half of this volume (280 ml) is poured over one end surface of a filter as used in example 1 and is subsequently dried in the drying oven for 4 hours at 100° C. The copper chloride absorption amounts to 50 g.

EXAMPLE 4

A Diesel filter as used in Example 1 is coated from the direction of one front end surface with 45 g γ-aluminum oxide from a 10% γ-aluminum oxide dispersion, which contains the noble metals platinum and palladium in a weight ratio of 2:1 in the form of H$_2$PtCl$_6$ and PdCl$_2$. With 45 g of aluminum oxide, a total of 2.58 g of platinum and 1.29 g of palladium are adsorbed by the filter. After subsequent drying at 250° C. overnight and thermal decomposition of the noble metal compounds at 600° C. over 2 hours in the muffle furnace, these were reduced for 2 hours at 550° C. in a stream of hydrogen.

After cooling down, the other side of the filter which is not yet coated is impregnated as in Example 2 and is designated as the input side of exhaust gas.

EXAMPLE 5

50 g of copper chromium oxide-γ-aluminum oxide mixture (75 parts by weight:25 parts by weight), 4 g NiO (Merck No: 6723), 10 g of $TiO_2$ (a pyrogenic titanium dioxide identified as P 25 of the Degussa company) and 50 g $V_2O_5$ (Merck No: 824), the latter doped with 3% $K_2O$ (mixing with KOH, drying and tempering), are rolled with 4.5 ml of concentrated nitric acid and 400 ml of de-ionized water for 24 hours in a ball mill. Subsequently the ground material is diluted with de-ionized water to 1 liter total volume and a Diesel filter, used as in Example 1 is impregnated with 400 ml of this mixture from the direction of one side. After that it is dried for 3 hours at 300° C. The absorption of solid substance amounts to a total of 45.6 g. The coated side is designated as the inlet side of the exhaust gas.

EXAMPLE 6

In a solution of 1.2 g $Cu(NO_3)_2.3H_2O$ (Merck No: 2751) in 100 ml of de-ionized water, 50 g of $TiO_2$ (a pyrogenic titanium dioxide identified as P 25 of Degussa company) are stirred in and the mixture is dried in the drying oven for 2 hours at 300° C. 25 g are taken from the dried product and are rolled in a ball mill with 2.5 g $V_2O_5$ (Merck No: 824) and 200 ml of de-ionized water, containing 0.45 g KOH, for 24 hours. This is subsequently diluted with $H_2O$ to 280 ml and a Diesel filter as used in Example 1 is impregnated with it from the direction of one front side. After 2 hours of drying at 300° C. in the drying oven the coated side of the filter is designated as the inlet side for the exhaust gas.

EXAMPLE 7

A Diesel filter, as used in Example 1 is treated as described in Example 4, by coating it from one side with half of the washcoat, containing half the noble metal and by coating it from the other side (as in Example 2) with 40 g $V_2O_5$, doped with 5% by weight of $K_2O$. The side coated with the latter is designated as the input side of the exhaust gas.

EXAMPLE 8

A Diesel filter as the one used in Example 1 is coated as in Example 4 only with γ-aluminum oxide and noble metals (platinum/palladium) and is subsequently subjected to the same activation as in Example 4.

EXAMPLE 9

100 g $(NH_4)_2Ce(NO_3)_6$ (Rhone-Poulenc company) are dissolved in 4 liters of de-ionized water and 200 ml of concentrated nitric acid. To this 28 g $NaVO_3.H_2O$ (a product sold by the Riedel de Haen company and identified by No. 14203), dissolved in 500 ml of hot water, are added and the reaction mixture is heated to 80°–100° C. The precipitated Ce(IV)-vanadate ($2CeO_2.V_2O_5.nH_2O$) is washed free of nitrate with warm water under repeated decanting is subsequently rolled with 400 ml of water overnight in a ball mill. The ground material is combined with water to 550 ml and a Diesel filter as used in Example 1 is impregnated with it from one side and excess suspension is blown out. After drying for 3 hours at 300° C. the process is repeated with the same side of the filter. The adsorption of cerium (IV)-vanadate amounts to 30 g.

EXAMPLE 10

150 g of LiOH (Merck No. 5691) are dissolved in 3.5 liters of de-ionized water. A Diesel filter, as used in Example 1, is impregnated with the solution and is blown out with air for the removal of excess coating material. After 3 hours of drying at 200° C. the adsorption of solid substance amounts to 21 g.

EXAMPLE 11

Comparative Example 400 g of CuO (Merck No. 2761) are stirred into 1200 ml of de-ionized water and 31 ml of concentrated nitric acid and are rolled for 24 hours in a ball mill.

A Diesel filter as used in Example 1 is impregnated with the suspension and is blown out with air for the removal of excess coating material. After 1 hour of drying at 450° C. the adsorption of solid substance amounts to 68 g.

EXAMPLE 12

Comparative Example 500 g copper chromium oxide, 40 g NiO (Merck No: 6723) and 100 g $TiO_2$ (a pyrogenic titanium dioxide identified as P 25 of Degussa company) are stirred into 1500 ml of de-ionized water and 45 ml of concentrated nitric acid and are subsequently ground in a ball mill for 24 hours. A filter as used in Example 1 is impregnated on both sides with the suspension obtained and is blown out with air for the removal of excess coating material. After 1 hour of drying at 450° C. the adsorption of solid substance amounts to 73 g.

EXAMPLE 13

40 g of vanadium pentoxide (Merck No: 824) are dispersed in a beaker in 600 ml of de-ionized water and are stirred for 15 minutes with a Ultra-Turrax, a high intensity laboratory dispersion apparatus sold by the company Janke & Kunkel GmbH & Co. KG of Staufen, Germany brand high duty stirrer. A filter body as used in Example 1 is impregnated with the suspension thus obtained from the direction of one front side and excess suspension is blow out. This process is repeated once after a drying step of 1.5 hours at 300° C. In addition, a 5 hour drying at 120° C. takes place. The filter is now coated from the direction of one side with about 37 g of $V_2O_5$.

Subsequently, the filter is impregnated from the direction of the same side with 250 ml of a 1% by weight KOH-solution. After 1 hour of drying at 300° C. in the drying furnace and a tempering of equal duration in the muffle furnace at 400° C. the catalytic filter coated in this manner, is ready for use.

EXAMPLE 14

Application test

Each of the filters produced in Examples 1–13, inclusive of an uncoated filter, was inserted into the exhaust gas stream of a Diesel engine and was checked as to their function for lowering the soot ignition temperature. The test parameters were:

(a) Engine 4 cylinder injection engine, Diesel
1.6 l displacement
40 kW power output (b) Soot loading phase of the filter rpm: 2900 min$^{-1}$
load: 33N
oxygen content in the exhaust gas: ca. 14.2 Vol.%

In the soot loading phase (b), the filter was exposed to the flow of exhaust gas, until a pressure difference of 150 mbar over the filter was reached. In order to determine the ignition temperature, the load was continuously increased at a constant rpm (2900 min$^{-1}$), until the rise of the differential pressure over the filter came to a standstill (FIG. 2).

The temperature in the stream of exhaust gas reached thereby in front of the filter is defined as ignition temperature, since no further soot agglomeration takes place in the event of a constant differential pressure, i.e., an equilibrium ensues between filtered-out and burned-off soot.

Table 1 shows these ignition temperature together with the pertinent load and the corresponding oxygen content in the exhaust gas for an attachment close to the engine of the filter (about 1 m behind the engine). Table 2 contains the corresponding values for attachment located more distant from the engine (about 3-3.5 m behind the engine).

The variable oxygen concentrations in the exhaust gas arise as a result of the load values needed for the burning-off or ignition temperatures. A high load is equivalent to a richer mixture and high exhaust gas temperature and thus also to a lower oxygen content in the exhaust gas.

Further variations and modifications of the invention will be apparent to those skilled in the art and are intended to be encompassed by the claims appended hereto.

TABLE 1

| Example | Ignition Temp. (°C.) | rpm (min$^{-1}$) | load (N) | % O$_2$ in the exhaust gas |
|---|---|---|---|---|
| * | 505 | 2900 | 77 | 7.8 |
| 1 | 476 | " | 71 | 8.6 |
| 2 | 416 | " | 64 | 9.8 |
| 3 | 300 | " | 55 | —** |
| 5 | 412 | " | 62 | 10.0 |
| 6 | 413 | " | 63 | 10.0 |
| 7 | 406 | " | 63 | 10.3 |
| 8 | 484 | " | 75 | 8.3 |
| 9 | 425 | " | 65 | 10.0 |
| 13 | 383 | " | 56 | 11.3 |

*Filter body without catalyst
**No exact determination of the O$_2$-portion in the exhaust gas possible

TABLE 2

| Example | Ignition Temp. (°C.) | rpm (min$^{-1}$) | load (N) | % O$_2$ in the exhaust gas |
|---|---|---|---|---|
| * | 520 | 2900 | 82 | 5.4 |
| 1 | 455 | " | 74 | 7.7 |
| 4 | 431 | " | 70 | 8.1 |
| 8 | 498 | " | 80 | 6.2 |
| 10 | 467 | " | 76 | 7.3 |
| 11 | 513 | " | 82 | 5.3 |
| 12 | 504 | " | 80 | 6.0 |

We claim:

1. A process for the reduction of ignition temperature of Diesel soot filtered out of the exhaust gas of Diesel engines comprising passing the exhaust stream produced by a Diesel engine over a catalytically active substance consisting of an alkali metal perrhenate or silver perrhenate or an admixture of an alkali metal perrhenate or silver perrhenate with one or more of lithium oxide, copper (I)-chloride, vanadium pentoxide with 1-30% by weight of an alkali metal oxide and a vanadate of lithium, sodium, potassium or cerium.

2. The process as in claim 1, wherein the catalytically active substance is deposited on a temperature stable carrier substance or is mixed with it.

3. The process as in claim 1, wherein the catalytically active substance or its combination with a carrier material is applied to a filter element serving as a structural reinforcer, the filter element being disposed at the flow cross section of the exhaust gas stream.

4. The process as in claim 3, wherein the structural reinforcer is a shaped body formed of temperature stable metal- or mineral wool, or a monolithic ceramic body having two oppositely disposed end surfaces and numerous flow channels passing through it, the openings of the channels being provided at opposite front surfaces with closing means in such a way that a channel is open on one end surface thereof and is closed on the opposite end surface thereof.

5. The process as in claim 2, wherein a noble metal is additionally deposited on the carrier.

6. The process as in claim 3, wherein the active substance is applied in the area of the inlet side of the filter and a noble metal impregnation is applied in the area of the outlet side of the filter.

7. A process for the reduction of ignition temperature of Diesel soot filtered out of the exhaust gas of Diesel engines comprising passing the exhaust stream produced by a Diesel engine over a first and a second catalytically active substance, the first active substances being selected from the group consisting of lithium oxide, copper (I)-chloride, vanadium pentoxide with 1-30% by weight of an alkali metal oxide, a vanadate of lithium, sodium, potassium or cerium or admixtures thereof and the second active substance being noble metal, whereby both first and second catalytically active substances or their combinations with a carrier material are deposited on different areas of a temperature stable filter element serving as structural reinforcer, disposing said filter element in the flow cross section of the exhaust gas stream, said filter element being a monolithic ceramic body having two oppositely disposed end surfaces and numerous flow channels passing through it and having macroporous walls, the openings of the channels being provided at the opposite front surfaces with closing means in such a way that a channel is open on one end surface thereof and is closed on the opposite end surface thereof, the first catalytically active substance being applied in the area of the inlet side of the filter and the second catalytically active substance being applied in the area of the outlet side of the filter, both said active substances thus covering opposite sides of the area of each macroporous flow channel wall of the monolithic ceramic body.

* * * * *